May 21, 1957  P. ROBINSON ET AL  2,793,334
ELECTRICAL CONDENSERS
Filed Oct. 24, 1950
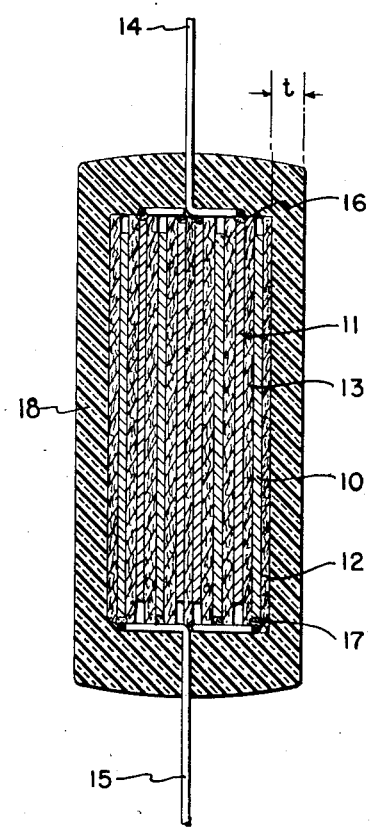
INVENTORS
PRESTON ROBINSON &
HAROLD J. St. DENIS
BY Arthur G. Connolly
their ATTORNEY

United States Patent Office 2,793,334
Patented May 21, 1957

2,793,334

ELECTRICAL CONDENSERS

Preston Robinson, Williamstown, and Harold J. St. Denis, North Adams, Mass., assignors to Sprague Electric Company, North Adams, Mass., a corporation of Massachusetts Application October 24, 1950, Serial No. 191,764

1 Claim. (Cl. 317—258)

This invention relates to improved electrical condensers and insulation therefor and more particularly related to improved molded electrical condensers. This application is filed as a continuation-in-part of copending application Serial Number 718,962, filed December 28, 1946, now Patent No. 2,526,688, granted October 24, 1950.

It has long been a practice to attempt to seal electrical apparatus, such as a stacked mica condenser, by inserting it in a mold and then with the application of heat and pressure molding a thermosetting resin about it. Such molded articles have been considered resistant to water, oil and common solvents except where leads or terminals penetrate the molding, and these weak spots generally are reinforced by dipping the molded article in a wax or resin varnish.

In molding oil- or wax-impregnated condensers with thermosetting resins, such as phenol-formaldehyde, it has been found that the molding pressures and, in some cases, the molding temperatures are often sufficient to damage the condenser insert. For this reason, molded condensers employ 30% to 50% greater insulation thickness than is required for unmolded condensers of the same material. It has been extremely difficult to mold phenol formaldehyde about a cylindrical oil-impregnated condenser without collapsing or distorting the condenser, causing a dead short or a low voltage breakdown in the product. In addition, the oil squeezes out between the upper and lower molding preforms, leaving a weak joining line.

It is an object of the present invention to overcome the foregoing and related disadvantages. It is a further object to produce outstanding molded electrical condensers and other electrical devices. A still further object is to produce a hermetically sealed, durable electrical condenser by inexpensive and simple means. A still further object is to produce molded insulation members possessing properties heretofore practically unattainable. A still further object is to utilize molding compounds and processes heretofore of limited practical value because of the physical properties of the final product. Additional objects will become apparent from a consideration of the following description and claim.

These objects are attained in accordance with the present invention wherein there is produced a rigidly encased electrical assembly comprising an electrical device with a plurality of terminal elements extending therefrom encased in a porous, rigid resin casing, the pores of said resin and the openings in said encased device being substantially completely impregnated with a dielectric material. In a more restricted sense, the invention is concerned with a rigidly encased electrical capacitor comprising electrode foils convolutely wound and separated by dielectric spacing material, terminal elements being provided to each of said foils and extending from the winding, a porous, rigid resin casing surrounding said winding and the portions of said terminal elements adjacent to said windings, a dielectric material substantially completely filling the pores of said casing and the winding, said dielectric material being selected from the class of dielectric waxes, dielectric oils and polymerized-in-situ dielectric resins.

The invention is also concerned with a process for producing electrical capacitors which comprises convolutely winding electrode foils with paper dielectric spacing material, affixing terminal elements to each of said foils, conditioning said foils, conditioning said winding until said paper contains from about 5% to about 17% by weight of moisture, molding about said winding and the portions of said terminal elements adjacent to said winding a porous resin casing, converting said resin to a rigid thermoset body, removing the moisture from molded assembly and impregnating said paper and the pores of said resin housing with a dielectric material.

While the invention is generally concerned with electrical devices of many types, such as transformers, coils, resistors, stacked condensers, networks, etc., it will be described with particular reference to rolled condensers and ceramic or enamel capacitors. The former consist of electrode foils, at least two but often more, convolutely wound with dielectric spacing material, with terminal elements affixed by soldering, welding, etc. to each of the foils. The winding may be of the so-called inductive type, wherein the foils are totally enclosed within the winding and termination is effected by flexible metal tabs which are laid in contact with the foil during winding, or of the so-called non-inductive type wherein the edge of one electrode foil extends from one side of the winding and the edge of the other foil from the opposite side of the winding. To these extended edges are soldered or otherwise affixed terminal wires, bolts, eyelets, etc. as desired.

The electrode foils usually consist of aluminum, copper, lead and similar materials, though in the case of electrolytic capacitors, rectifiers, transistors, thermistors, etc., special metal foils or plates are frequently employed.

The dielectric spacer may comprise calendered kraft paper, regenerated cellulose, cellulose ester film, cellulose ether film, or other dielectric spacing known to the art. In accordance with one of the preferred embodiments of the invention, the spacer consists of calendered kraft paper which, at the time of the molding step contains from about 5% to about 17% moisture. Such a paper, whose moisture level may be attained by conditioning in an appropriately humid atmosphere, is characterized by extreme resiliency and capacitor sections employing it may be molded successfully without distortion or other disruptive effect on the insulation. This resiliency is of particular importance in the manufacture of rolled, cylindrical type capacitors. Further, the paper will subsequently shrink to a noticeable degree during the drying process. This feature is of particular importance since it stabilizes the overall assembly; the resin casing shrinks to a noticeable extent during the polymerization or curing process and, were the insert to maintain the same size, severe tension strains would be set up in the resin, possibly resulting in cracks and rupture of the resin casing.

The types of resin casings which may be applied are numerous. Application may be accomplished by molding, usually but not necessarily at elevated temperatures. The molding pressure may be from about 10 to about 10,000 pounds per square inch. Thermosetting condensation resins, such as the phenol-formaldehyde, melamine-formaldehyde, urea-formaldehyde and modified derivatives thereof are suitable resins and are normally employed with a substantial quantity of filler material. The latter will be discussed in later paragraphs. Another class of resins suitable for use herein comprises the alkyd resins which when fully condensed or cross-linked, are converted to hard, tough resins essentially thermosetting in nature. Such resins consist, for example, of condensation products of maleic acid anhydride with polyhydroxy compounds of which propylene glycol, glycerin and ethylene glycol are representative. Thermoplastic resins such as polyethylene, polystyrene, polymethylmethacrylate, butadiene-styrene copolymers, etc., may also be employed as the casing resins, providing the desired porosity is achieved.

The selection and use of the filler material form an important part of the invention, since the porosity and impregnability of the molded casing may depend upon the filler material. We ordinarily employ from about 15% to about 75% filler in our molding resin and prefer to operate within the range of 25% to about 60%. The filler may be fibrous type, an amorphous type, or a crystalline type. Among the fibrous types are included cotton linters, rag stock and asbestos. Typical amorphous materials are fuller's earth, talc and wood flour. Ground mica, rutile, silica and quartz are representative crystalline fillers.

The porosity should be such that the pores will occupy from about 28% to 3% of the volume of the resin housing. The pore size is preferably between about 5 microns and about .0005" for best results. In some cases, the resin is molded about the insert without filler but with an appreciable solvent content, about 5 to 25% by volume. By way of example, 18% by volume has been found quite suitable. Removal of the solvent by subsequent heating of the assembly will cause formation of the desired pores.

Fibrous fillers are preferred in those cases where the resin casing is applied by heat and pressure in those cases where the resin casing is applied by heat and pressure molding, as is normally the case with phenol-, melamine- and urea-formaldehyde resins. For greatest porosity the fiber length may be at least as great as the thickness of the molded casing at its thinnest portion.

The molding conditions, as have been previously indicated, fall into two general categories. First, conventional heat and pressure molding cycles, where the resin passes through a liquid stage and is cured while still in the mold to a solid relatively rigid condition. The formaldehyde condensation resins mentioned in the previous paragraph are normally molded in such a manner, with the pressure being on the order of 200 to 10,000 pounds per square inch and the temperature from about 100° C. to about 225° C. The molding cycle may require from about 30 seconds to about 10 minutes, depending upon the resin and the size and shape of the insert. We have found it possible to obtain excellent results in the final product by reducing the curing time in the press to or near the minimum time necessary to obtain a readily ejected and coherent molded unit. This is quite in contrast with the usual practice, where the longer curing cycles were preferred for best results, even though the economics of production were unfavorably affected by so doing. As a general rule, both to obtain good results and to reduce expense, we prefer to employ short press curing cycles of about two minutes or less.

A second molding process which may be employed to good advantage in accordance with the present invention does not involve the use of external heat during the molding process. The resin, containing a filler material and up to about 25% of a solvent, is formed into a putty-like sheet or strip which is molded under relatively low pressure about the insert. After the molding step, which occupies from one to ten seconds, the molded insert is removed and heated to convert the resin into its final cured state and also to remove the solvent, if any be present. The removal of the solvent ordinarily leads to the formation of a porous resin casing which is essential in the present invention. Preferred resins for this "cold" type of molding are the alkyd and styrene modified alkyd resins which may be employed in the partially cured state. The heating cycle which follows the molding is ordinarily conducted for one to 24 hours at temperatures from about 75° C. to about 150° C. In the case of molded capacitors, this curing step may be combined with the removal of water from the capacitor winding, prior to the impregnation step. In such instances, it is advisable to conduct the initial curing phase at a temperature below about 100° C., to eliminate the possibility of blistering of the casing. Suitable solvents include alcohols, ketones, glycols (employed in excess over the reactible acid in the resin), etc. The viscosity of the uncured resin with its filler may obviate the necessity for use of a solvent.

It is ordinarily desirable to mold inserts in a mold designed to give a relatively thin casing, preferably less than .08" and for best results, less than .06". The thin sectioning of the molding need not be present throughout the unit, but preferably over at least 25% of the surface area of the insert proper, if the insert is a stacked or rolled paper condenser, either cylindrical or flat in form. Thus it may be desired to use thicker sections in the portions of the molding which require heavier or stronger insulation for electrical or structural reasons. As mentioned previously it is preferred when heat and pressure molding is used to employ a filler with a fiber length at least equal to the thickness of the thinnest section of the casing.

According to another of the embodiments of the invention, our molded units may be dried under reduced pressures at elevated temperatures to remove moisture and other readily vaporizable materials from both the insert and the molded resin. This drying is preferably under a pressure less than 500 microns of mercury and at temperatures between about 100° C. and 150° C. The time required for drying will vary with the porosity of the molded resin, the condition of the insert, and the size and structure of the molded unit as a whole. As a general but not invariable rule, the drying should be conducted for at least 16 hours.

The impregnation process is advisably conducted in the following manner: The molded units, either in the drying chamber or another low pressure chamber, are subjected to a pressure of 1,000 microns of mercury (1 mm.) or less and the dielectric impregnant is introduced into the chamber until it completely covers the molded units. The vacuum may then be broken, preferably with nitrogen, and super-atmospheric pressures applied to hasten impregnation through the resin and any filler therein. When impregnation is complete, the units may be removed from the chamber and drained to remove external oil or wax. The temperature and the time of impregnation depend upon the nature of the impregnant as well as the size and section thickness of the molded units. As a general rule the temperature is within the range of about 80° C. to about 150° C., and the time is within the range of about 30 minutes to about 24 hours.

The dielectric impregnant employed in accordance with this embodiment may be any of several types conventionally used in electrical condensers and related equipment, as well as others not previously of practical use. The impregnant should be a liquid at the temperature of impregnation and should possess a viscosity not greater than about 200 centipoises at this temperature and preferably not greater than 100 centipoises. Various dielectric oils may be used, for example, mineral oil, chlorinated diphenyls, vegetable oils such as caster oil, dehydrated castor oil, "silicone" oils and various synthetic dielectric oils. These oils are preferably impregnated into the molded unit, at temperatures between about 110° C. and about 135° C. It should be noted that dielectric materials which are solid at normal temperatures may be employed, so long as they are liquid at the impregnating temperature. Among these are the various hydrocarbon waxes, generally microcrystalline in structure, the chlorinated naphthalenes, hydrogenated castor oil, and other synthetic waxes. The impregnant should advisably be resistant to moisture.

Another class of impregnants which may be employed in accordance with this embodiment of the invention are the polymerizable vinyl compounds which may be impregnated as monomeric liquids and subsequently polymerized in situ by use of elevated temperatures and/or catalysts. Among these compounds which may be impregnated as monomeric liquids and subsequently polymerized are styrene and substituted styrenes, such as pentachlorostyrene 2,5-dichlorostyrene, p-chlorostyrene, etc.; N-vinyl pyrroles such as N-vinyl carbazole, etc. The allyl ester type monomers, such as di-allyl phthalate, are also useful per se or as copolymers with vinyl compounds. Also unsaturated esters such as propylene glycol maleate may be copolymerized with styrene to produce rigid dielectric impregnants. In the case of the N-vinyl carbazole, impregnation may be conducted at 85° C. Following impregnation, the units may be held at 120° C. for 24 hours to produce a solid impregnated condenser with high voltage breakdown and long life.

It has been found that molded condensers produced in accordance with the invention are extremely resistant to moisture and to thermal shocks. They may be exposed to high temperature and high humidity without failure, providing that a moisture resistant impregnant is employed. One of the outstanding features of the invention resides in the simplicity of the process and resultant low cost of the finished unit. Since the molding process, when effected with a moist paper spacer does not result in deformation or substantial damage to the rolled capacitor insert, the minimum thickness of paper necessary for electrical purposes may be used. No special means for impregnation of the capacitor insert need be provided and the finished unit may be symmetrical and attractive.

Three examples will further describe the invention.

A capacitor was produced by convolutely winding to a diameter of 5/8" two 0.0003" thick aluminum foils 1" wide with two sets of 0.0004" thick calendered kraft paper also 1" wide. One of the foils extended 3/16" from one side of the winding and the other the same distance from the other side of the winding. The extended foils were soldered to terminal wires. The capacitor section was conditioned in high humidity until the moisture content of the paper was 12%. Then the section was placed in a compression mold and molded at 155° C. for 1 minute and 40 seconds; the pressure was 500 p. s. i. and the molding resin was a phenol formaldehyde resin containing 45% asbestos fiber filler. The sides of the resin casing were 0.05" thick. After the molding, the assembly was vacuum dried for 18 hours under 500 microns Hg pressure. The unit was then impregnated with molten chlorinated naphthalene at 115° C. The resultant capacitor was life tested at 600 volts D. C. at 85° C. for 1000 hours without failure and was resistant to humidity.

Another capacitor was produced by winding to a diameter of 1/2" aluminum foil of the same dimensions as those given above with two sets of three layers of 0.0003" kraft paper 1 1/4" in width, such that the paper overlapped the foil throughout the winding. Half way through the winding, metal tabs were laid in against the foils so as to extend from opposite sides of the winding. To these tabs were soldered terminal wires. The resultant inductive-type capacitor was conditioned in high humidity until the moisture content of the paper was about 9%. The capacitor was then placed in a mold in between two putty-like sheets of molding resin, each one-tenth of an inch thick. The resin sheets were made up by mixing and rolling about 60 parts of a partially cured propylene glycol-maleic anhydride-styrene resin, 45 parts of finely shredded rag stock and 15 parts of butyl Carbitol acetate. The top and bottom of the mold were then pressed together in an arbor press to shape the resin around the insert and bond the upper and lower resin sheets together. The pressure during the molding was about 350 p. s. i. and was released after 5 seconds. The assembly was then held at 70° C. for 3 hours and then heated under vacuum for 16 hours at 120° C. At the end of this time, the capacitor was impregnated at 120° C. with mineral oil, the initial impregnating pressure being 300 microns Hg, followed by increase in the pressure to 15 p. s. i. The unit was tested for 100 hours at 85° C. at 900 v. D. C. without failure.

A similar capacitor was produced, but in this case 60 parts of the resin were employed with 18 parts of butyl Cellosolve and 1/2 part of lauryl peroxide. The characteristics of the capacitor, after impregnation with microcrystalline hydrocarbon wax were good. The unit was life tested at 750 v. D. C. at 65° C. without failure in 500 hours. In this case, the resin porosity prior to impregnation was about 21%.

It is to be understood that units produced in accordance with the invention may be given a top coating of hydrocarbon wax to assure humidity resistance, but this is necessary only in those instances wherein the dielectric impregnant itself does not impart sufficient humidity resistance to the molded unit.

Reference is made to the appended drawing which shows a cross-section of an electrical condenser produced in accordance with the invention. 10 and 11 represent electrode foils of the condenser unit convolutely wound and separated by dielectric spacing materials 12 and 13. Dielectric spacing materials 12 and 13 consist of a porous dielectric spacer, such as paper, the pores of which are impregnated with a liquid or molten solid dielectric material, such as mineral oil, chlorinated naphthalene, respectively etc. 14 and 15 represent terminal wires, preferably tinned copper, looped ends of which are soldered to the extended edges of electrode foils 11 and 10 respectively by means of solder seals 16 and 17. 18 represents the porous resin casing that contains an absorbent filler material and whose pores, after impregnation, are filled with the impregnant.

Dimension "t" represents the thickness of the section surrounding the cylindrical surface of the condenser section and generally should not be greater than .08" for optimum impregnation as well as optimum capacity per gross unit volume of the finished condenser.

As many apparently widely different embodiments of this invention may be made without departing from the spirit and scope hereof, it is to be understood that the invention is not limited to the specific embodiments hereof except as defined in the appended claim.

What is claimed is:

A rigidly encased electrical capacitor comprising convolutely wound electrode foils separated by paper dielectric spacing material, terminal wires connected to each of said foils and extending from said winding, said winding and the portions of said terminal wires adjacent to the winding being encased in a thermosetting resin housing not greater than .08" thick, the resin being mixed with a filler so that the housing has a porosity of between about 3 and 28 percent, the housing being otherwise free of openings, and the pores of said housing and said paper being substantially completely impregnated with a moisture resistant dielectric impregnant.

References Cited in the file of this patent

UNITED STATES PATENTS

| 1,497,415 | Thomas | June 10, 1924 |
| 1,871,492 | Brennecke | Aug. 16, 1932 |
| 1,934,192 | Houck | Nov. 7, 1933 |
| 2,183,550 | Deutschmann | Dec. 19, 1939 |
| 2,426,609 | Hodgdon | Sept. 2, 1947 |
| 2,506,446 | Dubilier | May 2, 1950 |
| 2,526,688 | Robinson | Oct. 24, 1950 |
| 2,549,770 | Burnham | Apr. 24, 1951 |
| 2,596,134 | Dorst | May 13, 1952 |

FOREIGN PATENTS

| 502,039 | Great Britain | Mar. 9, 1939 |